（12）United States Patent
Okano et al.

(10) Patent No.: US 11,411,720 B2
(45) Date of Patent: Aug. 9, 2022

(54) KEY DISTRIBUTION SYSTEM, TERMINAL DEVICE, KEY DISTRIBUTION METHOD, AND PROGRAM

(71) Applicant: NIPPON TELEGRAPH AND TELEPHONE CORPORATION, Tokyo (JP)

(72) Inventors: Yuki Okano, Tokyo (JP); Reo Yoshida, Tokyo (JP); Tetsutaro Kobayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/046,277

(22) PCT Filed: Mar. 27, 2019

(86) PCT No.: PCT/JP2019/013412
§ 371 (c)(1),
(2) Date: Oct. 8, 2020

(87) PCT Pub. No.: WO2019/198516
PCT Pub. Date: Oct. 17, 2019

(65) Prior Publication Data
US 2021/0083853 A1    Mar. 18, 2021

(30) Foreign Application Priority Data

Apr. 11, 2018  (JP) .............................. JP2018-076343

(51) Int. Cl.
*H04L 9/08*       (2006.01)
*H04L 9/30*       (2006.01)
(52) U.S. Cl.
CPC ............ *H04L 9/083* (2013.01); *H04L 9/3066* (2013.01)

(58) Field of Classification Search
USPC ........ 380/255, 264, 276, 282; 726/2, 21, 36; 713/150, 163, 181
See application file for complete search history.

(56) References Cited

U.S. PATENT DOCUMENTS 5,764,765 A * 6/1998 Phoenix ................ H04L 9/0858
                                              380/256
6,748,083 B2 * 6/2004 Hughes ................. H04L 9/0858
                                              380/278

(Continued)

OTHER PUBLICATIONS

Yoneyama et al. (2016) "Multi-Cast Key Distribution: Scalable, Dynamic and Provably Secure Construction", Cryptology ePrint Archive, Report 2016/833.

(Continued)

*Primary Examiner* — Sharif E Ullah (57) ABSTRACT

With respect to a key distribution system including N terminal devices $U_i$ and a key distribution server used for exchanging a session key, the key distribution system includes an isogeny calculating unit configured to calculate a first public value using a basis of a first torsion subgroup of a predetermined elliptic curve at an odd-numbered terminal device $U_i$ and calculate a second public value using a basis of a second torsion subgroup of the predetermined elliptic curve at an even-numbered terminal device $U_i$, when N is an even number, a distributing unit configured to distribute the first public value calculated at the odd-numbered terminal device $U_i$ to a terminal device $U_{i-1}$ and a terminal device $U_{i+1}$, and distribute the second public value calculated at the even-numbered terminal device $U_i$ to a terminal device $U_{i-1}$ and a terminal device $U_{i+1}$, from the key distribution server, a key generating unit configured to use second public values distributed by the distributing unit to generate the session key at the odd-numbered terminal device $U_i$, and use first public values distributed by the (Continued)

distributing unit to generate the session key at the even-numbered terminal device $U_i$, wherein the isogeny calculating unit calculates the first public value using the basis of the first torsion subgroup and the second public value using the basis of the second torsion subgroup at a predetermined terminal device $U_I$ among the terminal devices $U_i$, when N is an odd number.

5 Claims, 6 Drawing Sheets

(56) References Cited

U.S. PATENT DOCUMENTS

| | | | | |
|---|---|---|---|---|
| 7,437,081 | B2* | 10/2008 | Mitchell | H04B 10/70 |
| | | | | 398/154 |
| 8,855,316 | B2* | 10/2014 | Wiseman | H04L 9/0855 |
| | | | | 380/278 |
| 9,960,465 | B2* | 5/2018 | Dudley | H01M 10/6563 |
| 10,057,058 | B2* | 8/2018 | Murakami | H04L 9/0858 |
| 11,245,527 | B2* | 2/2022 | Uy | H04L 63/08 |
| 2005/0138352 | A1* | 6/2005 | Gauvreau | H04L 9/3247 |
| | | | | 713/153 |
| 2007/0065154 | A1* | 3/2007 | Luo | H04L 9/0852 |
| | | | | 398/141 |
| 2007/0076884 | A1* | 4/2007 | Wellbrock | H04L 9/0858 |
| | | | | 380/263 |
| 2007/0195774 | A1* | 8/2007 | Sherman | H04L 69/16 |
| | | | | 370/392 |
| 2011/0206204 | A1* | 8/2011 | Sychev | H04J 14/0273 |
| | | | | 380/256 |
| 2011/0213979 | A1* | 9/2011 | Wiseman | H04L 9/0844 |
| | | | | 713/171 |
| 2014/0010234 | A1* | 1/2014 | Patel | H04L 45/66 |
| | | | | 370/392 |
| 2014/0068765 | A1* | 3/2014 | Choi | H04L 63/1416 |
| | | | | 726/23 |
| 2014/0133652 | A1* | 5/2014 | Oshida | H04L 9/0866 |
| | | | | 380/255 |
| 2016/0241396 | A1* | 8/2016 | Fu | H04L 9/0858 |
| 2016/0359626 | A1* | 12/2016 | Fu | H04L 9/0858 |
| 2016/0366094 | A1* | 12/2016 | Mason | G06F 3/067 |
| 2017/0214525 | A1* | 7/2017 | Zhao | H04W 12/0431 |
| 2017/0230173 | A1* | 8/2017 | Choi | H04L 9/12 |
| 2018/0176091 | A1* | 6/2018 | Yoon | H04L 43/0888 |
| 2019/0036821 | A1* | 1/2019 | Levy | G06F 12/0868 |
| 2019/0349392 | A1* | 11/2019 | Wetterwald | H04L 43/0852 |
| 2020/0084222 | A1* | 3/2020 | William | H04L 9/3297 |
| 2021/0391981 | A1* | 12/2021 | Okano | H04L 9/0662 |

OTHER PUBLICATIONS

Kinjo et al. (2018) "Dynamic Multi-Cast Key Distribution with KEM", SCIS 2018 with English Machine Translation.

Jao et al. (2011) "Towards Quantum-Resistant Cryptosystems from Supersingular Elliptic Curve Isogenies", PQCrypto, pp. 19-34.

Vélu, Jacques (1971) "Isogenies between elliptic curves", l'Académie, Sci. Paris, Sér. A, t. 273. pp. 1-5, English ver. (Disclosed in the specification as "Isogénies entre courbes elliptiques, C. R. Acad. Sci. Paris Sér. A-B, 273:A238-241, 1971").

Lawrence C. Washington (2008) "Elliptic curves: Number theory and cryptography", 2nd ed., pp. 392-395.

Furukawa et al., (2016) "Group key exchange using isogenies", SCIS2016 pp. 1-8, English Machine Translation.

* cited by examiner

KEY DISTRIBUTION SYSTEM, TERMINAL DEVICE, KEY DISTRIBUTION METHOD, AND PROGRAM

TECHNICAL FIELD

The present invention relates to a key distribution system, a terminal device, a key distribution method, and a program.

BACKGROUND ART

With the spread of various user terminals, such as smartphones and tablet terminals, services that allow data to be deposited on a server and the data to be shared among many people have been increasing. Such services include, for example, online storage services, group chat services, and group mail services.

In a system that provides the above-described service, for example, eavesdropping on a communication path is prevented by encrypting the communication path, or information leakage caused by losing a user terminal or illegally bringing the user terminal outside is prevented by leaving no data in the user terminal. As described above, in systems that provide services described above, threats to communication channels (e.g., eavesdropping) and threats to user terminals (e.g., losing a user terminal or illegally bringing a user terminal outside) are often managed.

Here, in the systems that provide the services as described above, there is a possibility of information leakage due to the threats to the server. The threats to the server include, for example, attacks from the outside on the server and internal improprieties by a server administrator. As a method of preventing information leakage caused by these threats, for example, there is a method in which data is concealed to the server and is encrypted by end-to-end encryption that enables the data to be decrypted only at a user terminal.

In the end-to-end encryption, how to share a common key between user terminals is a problem. With respect to this, as one of multi-party key exchange technologies, a dynamic multicast key distribution (DMKD) protocol that can share a key between user terminals (which will be hereinafter referred to as a "session key") without leaking any information to an authentication server in a star-type network in which the authentication server is located at the center, is known. The DMKD protocol enables data to be sent and received between user terminals while concealing data contents to the authentication server. In the DMKD protocol, since the session key is shared only among multiple user terminals that send and receive data, for example, the session key is updated when a new user terminal is added to the multiple user terminals or when a user terminal is removed from the multiple user terminals.

Here, in Reference 1 below, a DMKD protocol using a Diffie-Hellman (DH) key exchange is proposed.

[Reference 1]
K. Yoneyama, R. Yoshida, Y. Kawahara, T. Kobayashi, H. Fuji, and T. Yamamoto. 2016. Multi-Cast Key Distribution: Scalable, Dynamic and Provably Secure Construction. Cryptology ePrint Archive, Report 2016/833. (2016).

However, it is known that the DMKD protocol proposed in Reference 1 is not quantum-resistant because the DMKD protocol uses a DH key exchange. Thus, as practical applications of quantum computers progress in the future, computational Diffie-Hellman (CDH) and Decisional Diffie-Hellman (DDH) problems, which are considered as computational hardness assumption, may be solved efficiently and security of key sharing may not be guaranteed. With respect to this, by using a key encapsulation mechanism (KEM), a DMKD protocol that can be applied to quantum-resistant encryption, such as lattice encryption and code-based encryption, has been proposed (Non-Patent Document 1).

RELATED ART DOCUMENTS

Non-Patent Documents

Non-Patent Document 1: Koha Kinjo, Yuki Okano, Tsunekazu Saito, Keita Xagawa, Tetsutaro Kobayashi, Bungaku Hoshino, "Dynamic Multi-Cast Key Distribution with KEM", SCIS 2018

SUMMARY OF INVENTION

Problem to be Solved by the Invention

However, the method proposed in Non-Patent Document 1 uses a key encapsulation mechanism, although the method is quantum-resistant. Thus, one more round in communication is required compared with the DMKD protocol using the DH key exchange. Therefore, the method proposed in Non-Patent Document 1 requires an extra communication cost, compared with the DMKD protocol using the DH key exchange.

The present invention is made in view of the above points, and it is an object of the present invention to achieve a multi-party key exchange that is quantum-resistant and that requires a low communication cost.

Means for Solving the Problem

In order to achieve the object described above, an embodiment of the present invention is a key distribution system including N terminal devices $U_i$ (i=1, ..., N) where N is greater than or equal to 2 and a key distribution server used for exchanging a session key by using isogeny cryptography between the N terminal devices $U_i$, and the key distribution system includes an isogeny calculating unit configured to calculate a first public value using a basis of a first torsion subgroup of a predetermined elliptic curve at an odd-numbered terminal device $U_i$ (i=1, ..., N−1) and calculate a second public value using a basis of a second torsion subgroup of the predetermined elliptic curve at an even-numbered terminal device $U_i$ (i=2, ..., N), among the terminal devices $U_i$, when N is an even number, a distributing unit configured to distribute the first public value calculated at the odd-numbered terminal device $U_i$ to a terminal device $U_{i-1}$ (where $U_0=U_N$ when i=1) and a terminal device $U_{i+1}$ (where $U_{N+1}=U_1$ when i=N), and distribute the second public value calculated at the even-numbered terminal device $U_i$ to a terminal device $U_{i-1}$ and a terminal device $U_{i+1}$, from the key distribution server; and a key generating unit configured to use the second public value distributed by the distributing unit to generate the session key at the odd-numbered terminal device $U_i$, and use the first public value distributed by the distributing unit to generate the session key at the even-numbered terminal device $U_i$, wherein the isogeny calculating unit calculates the first public value using the basis of the first torsion subgroup and the second public value using the basis of the second torsion subgroup at a predetermined terminal device $U_I$ among the terminal devices $U_i$, when N is an odd number.

Advantage of the Invention

According to the present invention, a multi-party key exchange that is quantum-resistant and that requires a low communication cost can be achieved.

EMBODIMENTS OF THE INVENTION

In the following, an embodiment of the present invention will be described. In the embodiment of the present invention, a key exchange system 1, in which a multi-party key exchange is performed using isogeny cryptography as quantum-resistant cryptography in communication of a smaller number of rounds (e.g., 2 rounds) than the number of rounds of the method proposed in Non-Patent Document 1, will be described.

<System Configuration>

Figure 1:
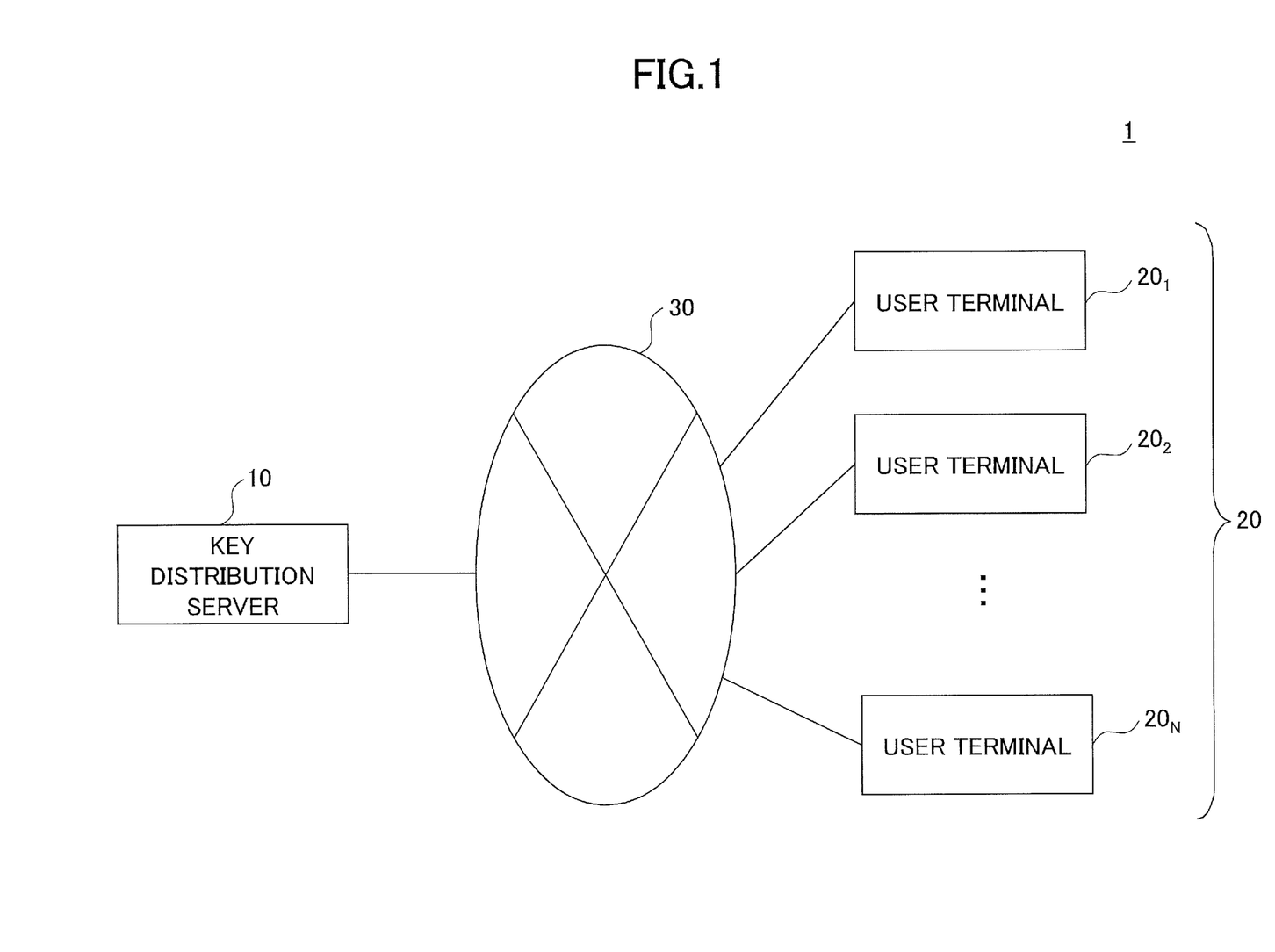
FIG. 1 is a drawing illustrating an example of a system configuration of a key exchange system according to an embodiment of the present invention.

As illustrated in FIG. 1, the key exchange system 1 according to the embodiment of the present invention includes a key distribution server 10 and multiple user terminals 20. The key distribution server 10 and each of the user terminals 20 are connected through a network 30, such as the Internet, in a communicable manner.

The key distribution server 10 is a server that distributes a public key of each of the user terminals 20 in order to share a common key among the user terminals 20. The key distribution server 10 is achieved by one information processing device (e.g., a computer) or multiple information processing devices.

The user terminal 20 is a terminal used by a user registered in the key exchange system 1 according to the embodiment of the present invention. Each of the user terminals 20 can share a common key by exchanging a public key with another user terminal 20 through the key distribution server 10. As the user terminal 20, various information processing devices, such as a smartphone, a tablet terminal, a personal computer (PC), a wearable device, a game device, a home appliance, and an embedded device, may be used.

In the embodiment of the present invention, among users registered in the key exchange system 1, the number of users who perform the key exchange is N, and the user terminals 20 used by these users are respectively represented by a "user terminal $20_1$," a "user terminal $20_2$," and a "user terminal $20_N$,". Thus, in the embodiment of the present invention, a subscript i ($1 \leq i \leq N$) is used as a symbol representing the user terminal $20_i$ ($1 \leq i \leq N$). In the embodiment of the present invention, S is used as a symbol representing the key distribution server 10.

Definition

Here, the symbols used in the embodiment of the present invention are defined.

n is an integer and Z/nZ is a quotient ring (or a residual ring) where n is a modulus of a ring of integers Z.

An integer f that is greater than or equal to 1 is selected such that Ex. 1 or Ex. 2 becomes a primary number.

$$l_A^{e_A} l_B^{e_B} \cdot f + 1 \quad \text{[Ex. 1]}$$

$$l_A^{e_A} l_B^{e_B} \cdot f - 1 \quad \text{[Ex. 2]}$$

Here, $l_A$ and $l_B$ are small prime numbers (e.g., 2 and 3) and $e_A$ and $e_B$ are integers.

$$l_A^{e_A} l_B^{e_B} \cdot f + 1 \quad \text{[Ex. 3]}$$

$$l_A^{e_A} l_B^{e_B} \cdot f - 1 \quad \text{[Ex. 4]}$$

When Ex. 3 or Ex. 4 is a prime number, Ex. 3 or Ex. 4 that is a prime number (when both are prime numbers, either of Ex. 3 or Ex. 4 is selected arbitrarily) is represented by p.

Additionally, the following will be defined.

$$F_{p^2} \quad \text{[Ex. 5]}$$

Ex. 5 is a two-dimensional field extension of a prime field $F_p$ of a characteristic p.

$$F_{p^2} \quad \text{[Ex. 6]}$$

E is an elliptic curve on Ex. 6.

$$E = \{(x,y) \in F_{p^2}^2 | y^2 = x^3 + ax + b, a, b \in F_{p^2}, 4a^3 + 27b^2 \neq 0\} \cup \{O\} \quad \text{[Ex. 7]}$$

For example, when E is defined by Ex. 7, E is an elliptic curve on Ex. 8.

$$F_{p^2} \quad \text{[Ex. 8]}$$

Here, O is a point at infinity. In the embodiments of the present invention, the following description assumes that the elliptic curve E is a supersingular elliptic curve.

A j-invariant of the elliptic curve E is expressed in Ex. 9.

$$j(E) = 1728 \frac{4a^3}{4a^3 + 27b^2} \quad \text{[Ex. 9]}$$

For an arbitrary point P on the elliptic curve E and an arbitrary integer m, the sum of m pieces of P is represented by [m]P. Here, the sum is an addition on the elliptic curve addition.

For the integer m, an m torsion subgroup E[m] of the elliptic curve E is defined as follows.

$$E[m] = \{P \in E | [m]P = O\}$$

For the integer m that cannot be divided evenly by p, it is known that the m torsion subgroup E[m] is expressed in Ex. 10.

$$E[m] \cong Z/mZ \times Z/mZ \quad \text{[Ex. 10]}$$

Here, Ex. 11 represents that an isomorphism exists between two groups A and B.

$$A \cong B \quad \text{[Ex. 11]}$$

In the embodiment of the present invention, k is a security parameter and a seed $s \in \{0,1\}^k$ is an index, and a function called a pseudo-random function is used in a family of functions $\{F_s:\text{Dom}_k \to \text{Rng}_k\}_s$ having a domain $\text{Dom}_k$ and a codomain $\text{Rng}_k$. In the embodiments of the present invention, a twisted pseudo-random function tPRF by the pseudo-random function is also used. Here, the twisted pseudo-random function tPRF is a function having a characteristic that it is difficult to distinguish an output of the function from a random value even when some of inputs are known.

The twisted pseudo-random function is disclosed, for example, in Reference 2 below.

[Reference 2]
K. Yoneyama, R. Yoshida, Y. Kawahara, T. Kobayashi, H. Fuji, and T. Yamamoto. "Multi-Cast Key Distribution: Scalable, Dynamic and Provably Secure Construction.", Cryptology ePrint Archive, Report 2016/833. (2016).

<Function Configuration>

Figure 2:
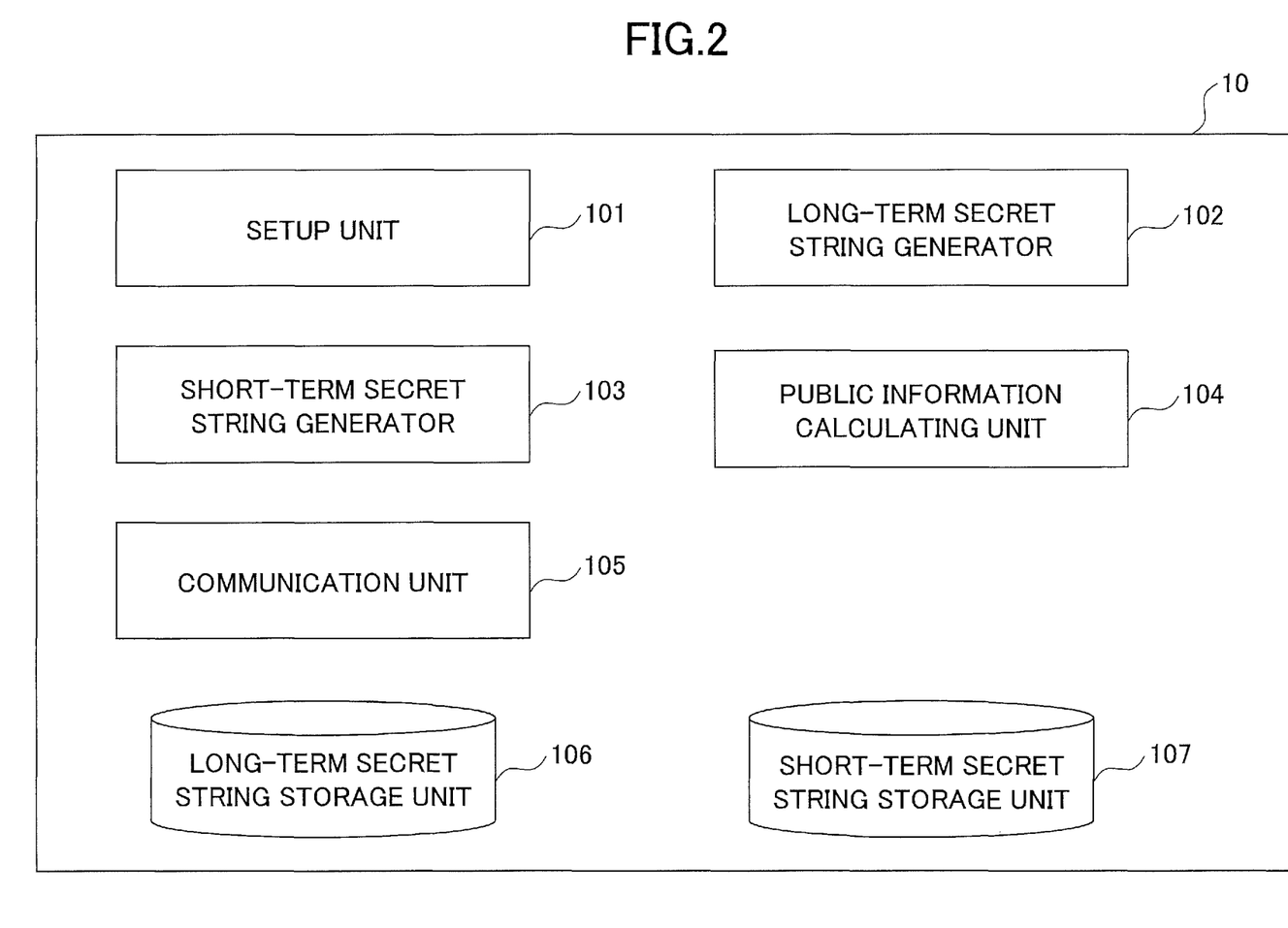
FIG. 2 is a drawing illustrating an example of a functional configuration of a key distribution server according to the embodiment of the present invention.

As illustrated in FIG. 2, the key distribution server 10 according to the embodiment of the present invention includes, as functional units, a setup unit 101, a long-term secret string generator 102, a short-term secret string generator 103, a public information calculating unit 104, a communication unit 105, a long-term secret string storage unit 106, and a short-term secret string storage unit 107. Each of the functional units enables the key distribution server 10 to achieve a preliminary process (FIG. 4) and a key exchange process (FIG. 5) described later.

Figure 3:
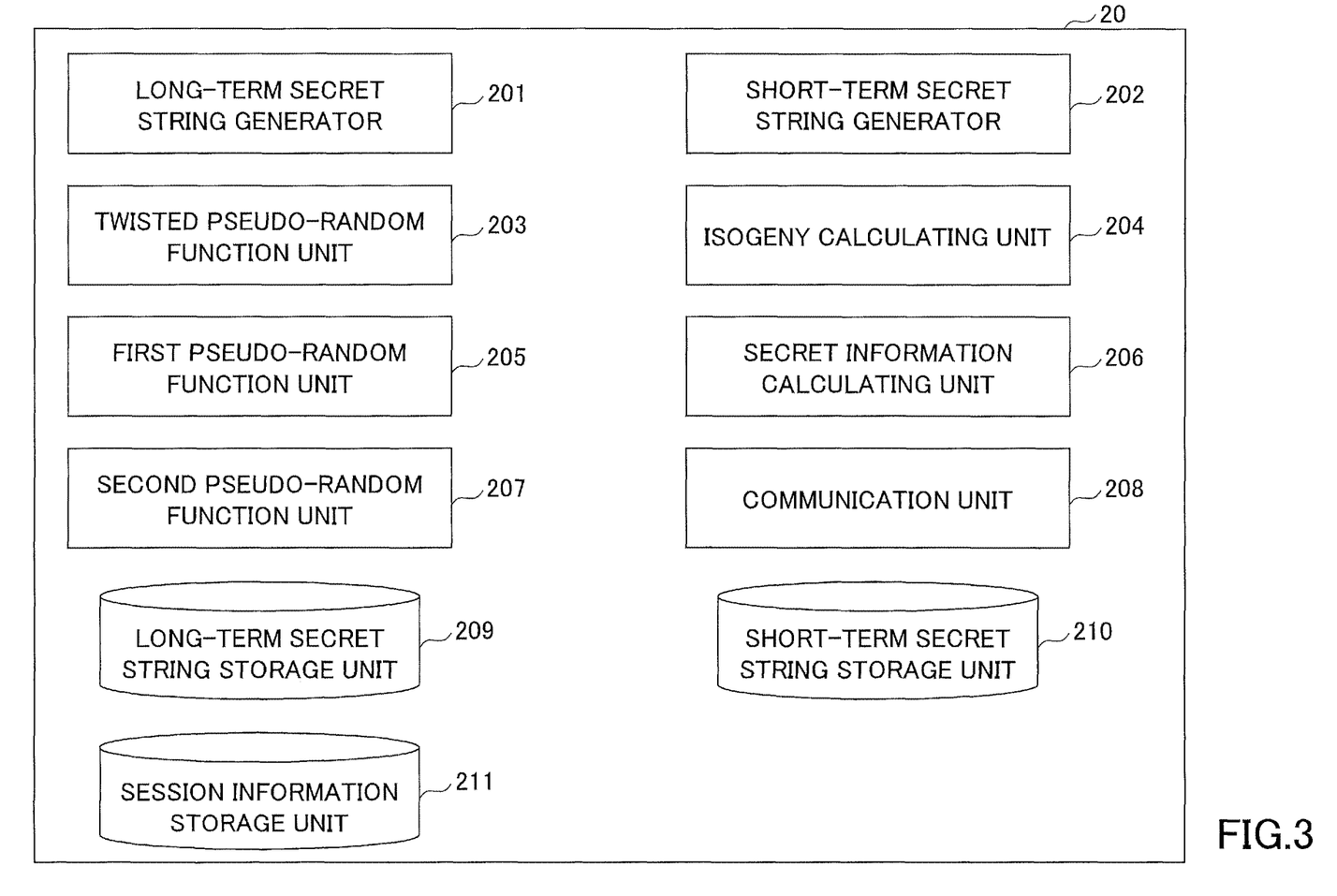
FIG. 3 is a drawing illustrating an example of a functional configuration of a user terminal according to the embodiment of the present invention.

As illustrated in FIG. 3, the user terminal 20 according to the embodiment of the present invention includes, as functional units, a long-term secret string generator 201, a short-term secret string generator 202, a twisted pseudo-random function unit 203, an isogeny calculating unit 204, a first pseudo-random function unit 205, a secret information calculating unit 206, a second pseudo-random function unit 207, a communication unit 208, a long-term secret string storage unit 209, a short-term secret string storage unit 210, and a session information storage unit 211. Each of the functional units enables each user terminal 20 to achieve the preliminary process (FIG. 4) and the key exchange process (FIG. 5) described later.

<Preliminary Process>

Figure 4:
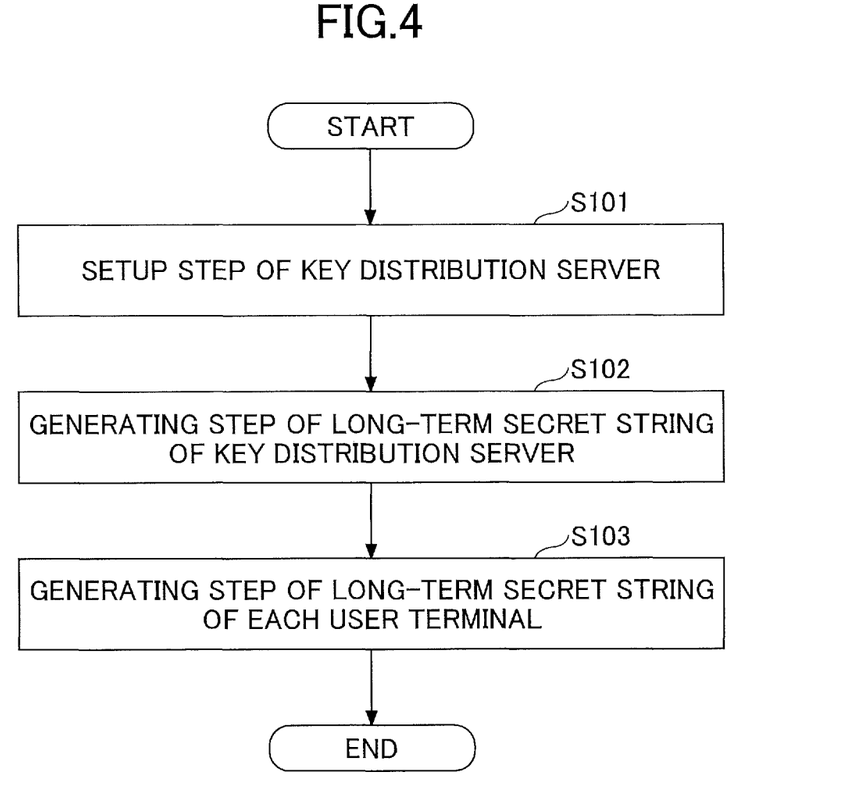
FIG. 4 is a drawing for describing an example of a flow of a preliminary process of the key exchange system according to the embodiment of the present invention.

Next, a flow of the preliminary process of the key exchange system 1 according to the embodiment of the present invention will be described with reference to FIG. 4. FIG. 4 is a drawing for describing an example of the flow of the preliminary process of the key exchange system 1 according to the embodiment of the present invention. Here, the security parameter k is predetermined. For example, k=256.

Step S101: Setup Step of the Key Distribution Server 10

The setup unit 101 of the key distribution server 10 selects an integer f such that a k-bit number Ex. 12 becomes a prime number.

$$p = l_A^{e_A} l_B^{e_B} \cdot f \pm 1 \qquad \text{[Ex. 12]}$$

Here, $l_A$ and $l_B$ are prime numbers and $e_A$ and $e_B$ are integers.

The setup unit 101 of the key distribution server 10 generates the supersingular elliptic curve E on Ex. 13, and selects Ex. 14 and Ex. 15.

$$F_{p^2} \qquad \text{[Ex. 13]}$$

$$\text{Bases } \{P_A, Q_A\} \text{ of } l_A^{e_A} \text{ torsion subgroup } E[l_A^{e_A}] \text{ of } E \qquad \text{[Ex. 14]}$$

$$\text{Bases } \{P_B, Q_B\} \text{ of } l_B^{e_B} \text{ torsion subgroup } E[l_B^{e_B}] \text{ of } E \qquad \text{[Ex. 15]}$$

For a method of selecting a basis, a method disclosed in Reference 3 below may be used for example.

[Reference. 3]
L. De Feo, D. Jao, "Towards quantum-resistant cryptosystems from supersingular elliptic curve isogenies", In PQCrypto, pp. 19-34, 2011. Further, the setup unit 101 of the key distribution server 10 uses $\text{Kspace}_k$ as a key space to generate the following twisted pseudo-random functions $\text{tPRF}_A$, $\text{tPRF}_B$, and tPRF.

$$\text{tPRF}_A : \{0,1\}^k \times \text{Kspace}_k \times \{0,1\}^k \times \text{Kspace}_k \to \mathbb{Z}/l_A^{e_A}\mathbb{Z}$$

$$\text{tPRF}_B : \{0,1\}^k \times \text{Kspace}_k \times \{0,1\}^k \times \text{Kspace}_k \to \mathbb{Z}/l_B^{e_B}\mathbb{Z}$$

$$\text{tPRF} : \{0,1\}^k \times \text{Kspace}_k \times \{0,1\}^k \times \text{Kspace}_k \to \{0,1\}^k \qquad \text{[Ex. 16]}$$

The setup unit 101 of the key distribution server 10 generates the following pseudo-random functions F and F'.

$$F : \{0,1\}^k \times F_{p^2} \to \{0,1\}^k$$

$$F' : \{0,1\}^k \times \{0,1\}^k \to \text{Kspace}_k \qquad \text{[Ex. 17]}$$

The setup unit 101 of the key distribution server 10 disseminates p, $l_A$, $e_A$, $l_B$, $e_B$, E, $P_A$, $Q_A$, $P_B$, $Q_B$, $\text{tPRF}_A$, $\text{tPRF}_B$, tPRF, F, and F'. This enables each user terminal 20 to utilize the disseminated information.

Step S102: Generating Step of the Long-Term Secret String of the Key Distribution Server 10

The long-term secret string generator 102 of the key distribution server 10 uniformly randomly generates $st_s \in \text{Kspace}_k$ and $st'_s \in \{0,1\}^k$ as the long-term secret strings. The long-term secret string generator 102 of the key distribution server 10 stores the generated long-term secret strings (i.e., $st_s$ and $st'_s$) in the long-term secret string storage unit 106.

Step S103: Generating Step of the Long-Term Secret String of Each User Terminal 20

The long-term secret string generator 201 of each user terminal 20 uniformly randomly generates $st_i \in \text{Kspace}_k$ and $st'_i \in \{0,1\}^k$ as the long-term secret strings. The $st_i$ and $st'_i$ are the long-term secret strings generated by the long-term secret string generator 201 of the user terminal $20_i$.

The long-term secret string generator 201 of each user terminal 20 stores the generated long-term secret strings (i.e., $st_i$ and $st'_i$) in its long-term secret string storage unit 209.

<Key Exchange Process>

Figure 5:
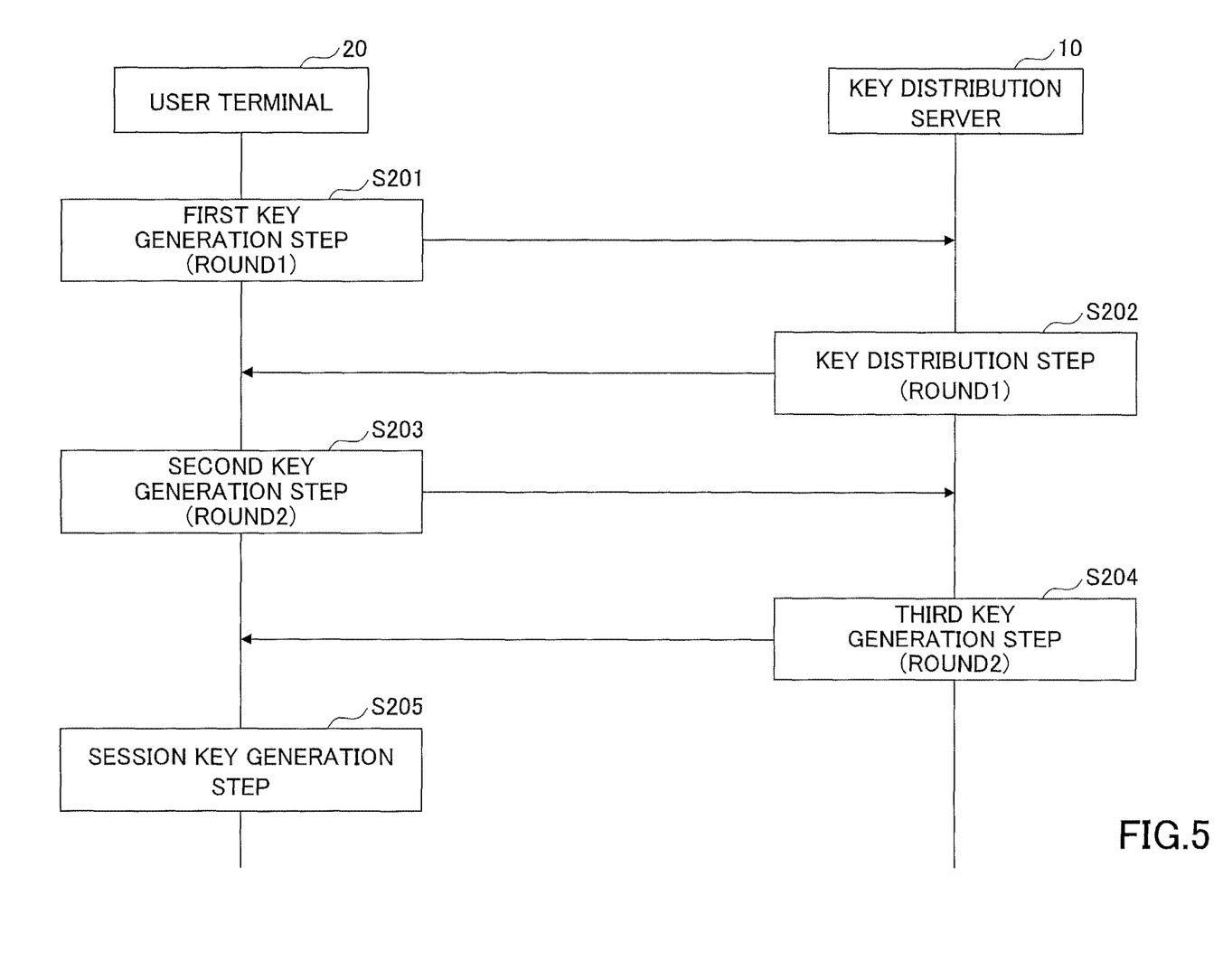
FIG. 5 is a drawing for describing an example of a flow of a key exchange process of the key exchange system according to the embodiment of the present invention.

Next, a flow of the key exchange process of the key exchange system 1 according to the embodiment of the present invention will be described with reference to FIG. 5. FIG. 5 is a drawing for describing an example of the flow of the key exchange process of the key exchange system 1 according to the embodiment of the present invention.

The key exchange process described below can be executed any number of times during an operation of the key exchange system 1. A single execution of the key exchange is called a "session". Hereinafter, operations of the key distribution server 10 and each user terminal 20 in a certain session will be described. The following description assumes that a session identifier identifying the session is $\text{sid} \in \{0,1\}^k$. For a generating method of the session identifier sid, any desired method may be used. For example, as disclosed in Non-Patent Document 1, there is a generating method using a commitment. The following description assumes that the key distribution server 10 and each user terminal 20 know the sid.

A user terminal 20 that is a representative among the user terminals 20 (i.e., a representative user terminal) is determined. Among the user terminal $20_1$, the user terminal $20_2, \ldots,$ and the user terminal $20_N$, any user terminal 20 may be the representative user terminal. The following description assumes that the user terminal $20_1$ is the representative user terminal. Selection of the representative user terminal and notification for indicating being the representative user terminal may be performed, for example, by the key distribution server 10.

The subscript i of the user terminal 20 is assumed to be in a ring. That is, adding 1 to i=N will be i=1, and subtracting −1 from i=1 will be i=N.

Here, in the isogeny cryptography, unlike DH key exchange, asymmetric computation is caused in two user terminals 20 either by generating a private key from a basis $\{P_A, Q_A\}$ or by generating a private key from a basis $\{P_B, Q_B\}$.

Thus, in a first embodiment, a case in which a process of the representative user terminal is different depending on whether the number N of the user terminals 20 is even or odd will be described. That is, in the first embodiment, when N is an even number, the user terminal 201, the user terminal $20_3$, . . . , and the user terminal $20_{N-1}$ calculate respective public values from the basis $\{P_A, Q_A\}$ and the user terminal $20_2$, the user terminal $20_4$, . . . , and the user terminal $20_N$ calculate respective public values from the basis $\{P_B, Q_B\}$. When N is an odd number, the user terminal 201, which is the representative user terminal, calculates public values from both of the basis $\{P_A, Q_A\}$ and the basis $\{P_B, Q_B\}$; the user terminal $20_3$, the user terminal $20_5$, . . . , and the user terminal $20_{N-1}$ calculate respective public values from the basis $\{P_A, Q_A\}$; and, the user terminal $20_2$, the user terminal $20_4$, . . . , and the user terminal $20_N$ calculate respective public values from the basis $\{P_B, Q_B\}$. The public values include $\varphi_i(P_A)$, $\varphi_i(Q_A)$, $\varphi_i(P_B)$, and $\varphi_i(Q_B)$, which will be described later.

In the second embodiment, a case in which all the user terminals 20 generate respective common keys from both of the basis $\{P_A, Q_A\}$ and the basis $\{P_B, Q_B\}$ without depending on whether the number N of the user terminals 20 is even or odd will be described.

First Embodiment

In the following, the first embodiment will be described.
<<Case where N is an Even Number>>
First, a case where N is an even number will be described.
Step S201: First Key Generation Step (Round1)
Subsequent S201-11 to S201-15 are executed by the user terminal $20_i$ (i=1, 3, . . . , N−1) where i is an odd number.

S201-11) The short-term secret string generator 202 uniformly randomly generates $r_i^{(1)} \in \{0, 1\}^k$, $r_i^{(2)} \in Kspace_k$, $r_i^{(3)} \in \{0, 1\}^k$, $r_i^{(4)} \in Kspace_k$, $k_i^{(1)} \in \{0, 1\}^k$, and $k_i^{(2)} \in Kspace_k$ as short-term secret strings.

The short-term secret string generator 202 stores the short-term secret strings $r_i^{(1)}, r_i^{(2)}, r_i^{(3)}, r_i^{(4)}, k_i^{(1)}$, and $k_i^{(2)}$ in the short-term secret string storage unit 210.

S201-12) The twisted pseudo-random function unit 203 generates $m_i = tPRF_A(r_i^{(1)}, r_i^{(2)}, st_i, st'_i)$, $n_i = tPRF_A(r_i^{(3)}, r_i^{(4)}, st_i, st'_i)$, and $k_i = tPRF(k_i^{(1)}, k_i^{(2)}, st_i, st'_i)$. The long-term secret strings $st_i$ and $st'_i$ stored in the long-term secret string storage unit 209 are used.

S201-13) The isogeny calculating unit 204 calculates an isogeny $\varphi: E \rightarrow E_i$ having a subgroup $K_i$ of E generated by $[m_i]P_A + [m_i]Q_A$ as a kernel and an elliptic curve $E_i$ associated with the isogeny $\varphi_i$.

The isogeny $\varphi_i$ having the subgroup $K_i$ as the kernel indicates an isogeny where $Ker\varphi_i = K_i$. It is known that such an isogeny $\varphi_i$ and a subgroup $K_i$ correspond one-to-one. The elliptic curve $E_i$ associated with the isogeny $\varphi_i$ is also expressed in $E_i = E/K_i$. For a method for calculating the isogeny $\varphi_i$, the method disclosed in reference 4 or 5 below may be used, for example.

[Reference 4]
J. Vélu, "Isogénies entre courbes elliptiques", C. R. Acad. Sci. Paris Sér. A-B, 273:A238-241, 1971.
[Reference 5]
Lawrence C. Washington. "Elliptic curves: Number theory and cryptography", 2nd ed., CRC Press, 2008.

S201-14) The isogeny calculating unit 204 calculates $\varphi_i(P_B)$ and $\varphi_i(Q_B)$.

S201-15) The communication unit 208 transmits $\varphi_i(PB)$, $\varphi_i(Q_B)$, and $E_i$ to the key distribution server 10. Thus, the public values $\varphi_i(PB)$, $\varphi_i(Q_B)$, and $E_i$ of the user terminal $20_i$ (i=1, 3, . . . , N−1) are transmitted to the key distribution server 10.

Subsequent S201-21 to S201-25 are executed by the user terminal $20_i$ (i=2, 4, . . . , N) where i is an even number.

S201-21) The short-term secret string generator 202 uniformly randomly generates $r_i^{(1)} \in \{0, 1\}^k$, $r_i^{(2)} \in Kspace_k$, $r_i^{(3)} \in \{0, 1\}^k$, $r_i^{(4)} \in Kspace_k$, $k_i^{(1)} \in \{0, 1\}^k$, and $k_i^{(2)} \in Kspace_k$ as short-term secret strings.

The short-term secret string generator 202 stores the short-term secret strings $r_i^{(1)}, r_i^{(2)}, r_i^{(3)}, r_i^{(4)}, k_i^{(1)}$, and $k_i^{(2)}$ in the short-term secret string storage unit 210.

S201-22) The twisted pseudo-random function unit 203 generates $m_i = tPRF_B(r_i^{(1)}, r_i^{(2)}, st_i, st'_i)$, $n_i = tPRF_B(r_i^{(3)}, r_i^{(4)}, st_i, st'_i)$, and $k_i = tPRF(k_i^{(1)}, k_i^{(2)}, st_i, st'_i)$. The long-term secret strings $st_i$ and $st'_i$ stored in the long-term secret string storage unit 209 are used.

S201-23) The isogeny calculating unit 204 calculates the isogeny $\varphi_i: E \rightarrow E_i$ having the subgroup $K_i$ of E generated by $[m_i]P_B + [n_i]Q_B$ as the kernel and the elliptic curve $E_i$ associated with the isogeny $\varphi_i$.

S201-24) The isogeny calculating unit 204 calculates $\varphi_i(P_A)$ and $\varphi_i(Q_A)$ S201-25) The communication unit 208 transmits $\varphi_i(P_A)$, $\varphi_i(Q_A)$, and $E_i$ to the key distribution server 10. Thus, the public values $\varphi_i(P_A)$, $\varphi_i(Q_A)$, and $E_i$ of the user terminal $20_i$ (i=2, 4, . . . , N) are transmitted to the key distribution server 10.

The $m_i$ and $n_i$ in S201-12 and S201-22 described above can be generated from a twisted pseudo-random function when necessary using the long-term secret string stored in the long-term secret string storage unit 209 and the short-term secret string stored in the short-term secret string storage unit 210. Thus, it is preferable not to store $m_i$ and $n_i$ for safety reasons.

However, if safety is not overly of consideration, $m_i$ and $n_i$ may be randomly generated from Ex. 18 and may be stored in S201-12 described above.

$$Z/l_A^{e_A}Z \quad [\text{Ex. 18}]$$

Similarly, $m_i$ and $n_i$ may be randomly generated from Ex. 19 and may be stored in S201-22 described above.

$$Z/l_B^{e_B}Z \quad [\text{Ex. 19}]$$

Step S202: Key Distribution Step (Round1)
S202-1) The communication unit 105 receives the public values $\varphi_i(P_B)$, $\varphi_i(Q_B)$, and $E_i$ from the user terminal $20_i$ (i=1, 3, . . . , N−1) where i is an odd number, and receives the public values $\varphi_i(P_A)$, $\varphi_i(Q_A)$, and $E_i$ from the user terminal $20_i$ (i=2, 4, . . . , N) where i is an even number.

S202-2) The communication unit 105 transmits sid, $\varphi_{i-1}(P_A)$, $\varphi_{i-1}(Q_A)$, $E_{i-1}$, $\varphi_{i+1}(P_A)$, $\varphi_{i+1}(Q_A)$, and $E_{i+1}(Q_A)$ to the user terminal $20_i$ (i=1, 3, . . . , N−1) where i is an odd number.

The communication unit 105 transmits sid, $\varphi_{i-1}(P_B)$, $\varphi_{i-1}(Q_B)$, $E_{i-1}$, $\varphi_{i+1}(P_B)$, $\varphi_{i+1}(Q_B)$, and $E_{i+1}$ to the user terminal $20_i$ (i=2, 4, ..., N) where i is an even number.

As described above, the subscript i of the user terminal 20 is in a ring. Thus, for example, to the user terminal $20_1$, which is i=1, sid, $\varphi_N(P_A)$, $\varphi_N(Q_A)$, $E_N$, $\varphi_2(P_A)$, $\varphi_2(Q_A)$, $E_2$ are transmitted. For example, to the user terminal $20_N$, which is i=N, sid, $\varphi_{N-1}(P_B)$, $\varphi_{N-1}(Q_B)$, $E_{N-1}$, $\varphi_1(P_B)$, $\varphi_1(Q_B)$, $E_1$ are transmitted.

Step S203: Second Key Generation Step (Round2)

Subsequent S203-11 to S203-16 are executed by the user terminal $20_i$ (i=3, 5, ..., N−1) where i is an odd number other than 1.

S203-11) The communication unit 208 receives sid, $\varphi_{i-1}(P_A)$, $\varphi_{i-1}(Q_A)$, $E_{i-1}$, $\varphi_{i+1}(P_A)$, $\varphi_{i+1}(Q_A)$, and $E_{i+1}$ from the key distribution server 10.

S203-12) The isogeny calculating unit 204 calculates an isogeny $\varphi_{i-1,i}: E_{i-1} \to E_{i-1,i}$ having a subgroup $K_{i-1,i}$ of $E_{i-1}$ generated by $[m_i]\varphi_{i-1}(P_A)$ $[n_i]\varphi_{i-1}(Q_A)$ as a kernel and an elliptic curve $E_{i-1,i}$ associated with the isogeny $\varphi_{i-1,i}$.

Similarly, the isogeny calculating unit 204 calculates an isogeny $\varphi_{i+1,i}: E_{i+1} \to E_{i+1,i}$ having a subgroup $K_{i+1,i}$ of $E_{i+1}$ generated by $[m_i]\varphi_{i+1}(P_A)+[n_i]\varphi_{i+1}(Q_A)$ as a kernel and an elliptic curve $E_{i+1,i}$ associated with the isogeny $\varphi_{i+1,i}$.

S203-13) The isogeny calculating unit 204 calculates a j-invariant $j(E_{i-1,i})$ of the elliptic curve $E_{i-1,i}$ and a j-invariant $j(E_{i+1,i})$ of the elliptic curve $E_{i+1,i}$.

S203-14) Next, the first pseudo-random function unit 205 calculates $K_i^{(l)}=F(sid, j(E_{i-1,i}))$ and $K_i^{(r)}=F(sid, j(E_{i+1,i}))$ S203-15) Next, the first pseudo-random function unit 205 calculates a bitwise exclusive or value $T_i$ of $K_i^{(l)}$ and $K_i^{(r)}$. That is, the first pseudo-random function unit 205 calculates Ex. 20.

$$T_i = K_i^{(l)} \oplus K_i^{(r)} \qquad \text{[Ex. 20]}$$

Here, $\oplus$ represents an exclusive or.

S203-16) The communication unit 208 transmits $k_i$ and $T_i$ to the key distribution server 10. $k_i$ is generated in the first key generation step (S201).

Subsequent S203-21 to S203-26 are executed by the user terminal $20_i$ (i=2, 4, ..., N) where i is an even number.

S203-21) The communication unit 208 receives sid, $\varphi_{i-1}(P_B)$, $\varphi_{i-1}(Q_B)$, $E_{i-1}$, $\varphi_{i+1}(P_B)$, $\varphi_{i+1}(Q_B)$, $E_{i+1}$ from the key distribution server 10.

S203-22) The isogeny calculating unit 204 calculates the isogeny $\varphi_{i-1,i}: E_{i-1} \to E_{i-1,i}$ having the subgroup $K_{i-1,i}$ generated by $[m_i]\varphi_{i-1}(P_B)+[n_i]\varphi_{i-1}(Q_B)$ as the kernel and the elliptic curve $E_{i-1,i}$ associated with the isogeny $\varphi_{i-1,i}$.

Similarly, the isogeny calculating unit 204 calculates the isogeny $\varphi_{i+1,i}: E_{i+1} \to E_{i+1,i}$ having the subgroup $K_{i+1,i}$ of $E_{i+1}$ generated by $[m_i]\varphi_{i+1}(P_B)+[n_i]\varphi_{i+1}(Q_B)$ as the kernel and the elliptic curve $E_{i+1,i}$ associated with $\varphi_{i+1,i}$.

S203-23) The isogeny calculating unit 204 calculates the j-invariant $j(E_{i-1,i})$ of the elliptic curve $E_{i-1,i}$ and the j-invariant $j(E_{i+1,i})$ of the elliptic curve $E_{i+1,i}$.

S203-24) Next, the first pseudo-random function unit 205 calculates $K_i^{(l)}=F(sid, j(E_{i-1,i}))$ and $K_i^{(r)}=F(sid, j(E_{i+1,i}))$.

S203-25) Next, the first pseudo-random function unit 205 calculates a bitwise exclusive or value $T_i$ of $K_i^{(l)}$ and $K_i^{(r)}$.

S203-26) The communication unit 208 transmits $k_i$ and $T_i$ to the key distribution server 10. Here, $k_i$ is generated in the first key generation step (S201).

Subsequent S203-31 to S203-37 are executed by the user terminal $20_1$, which is the representative user terminal.

S203-31) The communication unit 208 receives sid, $\varphi_N(P_A)$, $\varphi_N(Q_A)$, $E_N$, $\varphi_2(P_A)$, $\varphi_2(Q_A)$, and $E_2$ from the key distribution server 10.

S203-32) The isogeny calculating unit 204 calculates the isogeny $\varphi_{N,1}: E_N \to E_{N,1}$ having a subgroup $K_{N,1}$ of $E_N$ generated by $[m_1]\varphi_N(P_A)+[n_1]\varphi_N(Q_A)$ as a kernel and an elliptic curve $E_{N,1}$ associated with the isogeny $\varphi_{N,1}$.

Similarly, the isogeny calculating unit 204 calculates the isogeny $\varphi_{2,1}: E_2 \to E_{2,1}$ having a subgroup $K_{2,1}$ of $E_2$ generated by $[m_1]\varphi_2(P_A)+[n_1]\varphi_2(Q_A)$ as a kernel and an elliptic curve $E_{2,1}$ associated with the isogeny $\varphi_{2,1}$.

S203-33) The isogeny calculating unit 204 calculates a j-invariant $j(E_{N,1})$ of the elliptic curve $E_{N,1}$ and a j-invariant $j(E_{2,1})$ of the elliptic curve $E_{2,1}$.

S203-34) Next, the first pseudo-random function unit 205 calculates $K_1^{(l)}=F(sid, j(E_{N,1}))$ and $K_1^{(r)}=F(sid, j(E_{2,1}))$.

S203-35) Next, the first pseudo-random function unit 205 calculates a bitwise exclusive or value $T_1$ of $K_1^{(l)}$ and $K_1^{(r)}$.

S203-36) Next, the first pseudo-random function unit 205 calculates an exclusive or value T' of $K_1^{(l)}$ and $k_1$. That is, the first pseudo-random function unit 205 calculates Ex. 21.

$$T' = K_1^{(l)} \oplus k_1 \qquad \text{[Ex. 21]}$$

Here, $k_i$ is generated in the first key generation step (S201).

S203-37) The communication unit 208 transmits T' and $T_1$ to the key distribution server 10.

Step S204: Third Key Generation Step (Round2)

S204-1) The communication unit 105 receives T' and $T_1$ from the user terminal $20_1$, which is i=1, and receives $k_i$ and $T_i$ from the user terminal $20_i$ (i=2, 3, ..., N) where i is other than 1.

S204-2) The short-term secret string generator 103 uniformly randomly generates $k_s^{(1)} \in \{0, 1\}^k$ and $k_s^{(2)} \in Kspace_k$ as short-term secret strings. The short-term secret string generator 103 stores the short-term secret strings $k_s^{(1)}$ and $k_s^{(2)}$ in the short-term secret string storage unit 107.

S204-3) Next, the short-term secret string generator 103 calculates $k_s$=tPRF $(k_s^{(1)}, k_s^{(2)}, st_s, st'_s)$ and Ex. 22.

$$k' = (\oplus_{2 \le i \le N} k_i) \oplus k_s \qquad \text{[Ex. 22]}$$

The $st_s$ and $st'_s$ stored in the long-term secret string storage unit 106 are used.

S204-4) Next, the public information calculating unit 104 calculates an exclusive or value $T'_i$ of $T_j(1 \le j \le i-1)$ with respect to each $i \in \{2, ..., N\}$. That is, the public information calculating unit 104 calculates Ex. 23.

$$T'_i = \oplus_{1 \le j \le i-1} T_j \qquad \text{[Ex. 23]}$$

S204-5) The communication unit 105 then transmits k', $T'_i$, and T' to the user terminal $20_i$ (i=2, ..., N). The communication unit 105 transmits k' to the user terminal $20_1$.

Step S205: Session Key Generation Step

Subsequent S205-11 to S205-14 are executed by the user terminal $20_i$ where i is other than 1 (i.e., the user terminals 20 that are other than the representative user terminal).

S205-11) The communication unit 208 receives k', $T'_i$, and T' from the key distribution server 10.

S205-12) The secret information calculating unit 206 calculates an exclusive or value of $T'_i$ and T'. The exclusive or value matches $K_1^{(l)}$. That is, the exclusive or value is expressed in Ex. 24.

$$K_1^{(l)} = T'_i \oplus K_i^{(l)} \qquad \text{[Ex. 24]}$$

S205-13) Next, the secret information calculating unit 206 calculates an exclusive or value of T' and $K_1^{(l)}$. The exclusive or value matches $k_1$. That is, the exclusive or value is expressed in Ex. 25.

$$k_1 = T' \oplus K_1^{(l)} \qquad \text{[Ex. 25]}$$

S205-14) Next, the second pseudo-random function unit 207 calculates Ex. 26.

$$K=F'(sid,k'\oplus k_1) \quad \text{[Ex. 26]}$$

K is a session key.

The second pseudo-random function unit 207 stores the session key K in the session information storage unit 211.

Subsequent S205-21 to S205-22 are executed by the user terminal $20_1$, which is i=1 (i.e., the representative user terminal).

S205-21) The communication unit 208 receives k' from the key distribution server 10.

S205-22) Next, the second pseudo-random function unit 207 calculates Ex. 27.

$$K=F'(sid,k'\oplus k_1) \quad \text{[Ex. 27]}$$

K is the session key.

The second pseudo-random function unit 207 stores the session key K in the session information storage unit 211.

Therefore, the same session key K is shared between the user terminals $20_i$ (i=1, 2, ..., N). The session key K is used to encrypt data that is transmitted and that is received between the user terminals 20.

<<Case where N is an Odd Number>>

Next, a case where N is an odd number will be described. For a part performing a process similar to the process described when N is an even number, a description will be omitted or simplified, as appropriate.

Step S201: First Key Generation Step (Round1)

The user terminal $20_i$ (i=3, 5, ..., N), where i is an odd number other than 1, executes the above-described S201-11 to S201-15. The user terminal $20_i$ (i=2, 4, ..., N−1), where i is an even number, executes the above-described S201-21 to S201-25.

Subsequent S201-31 to S201-35 are executed by the user terminal $20_1$, which is i=1 (i.e., the representative user terminal).

S201-31) The short-term secret string generator 202 uniformly randomly generates $r_i^{(1)} \in \{0,1\}^k$, $r_i^{(2)} \in \text{Kspace}_k$, $r_i^{(3)} \in \{0,1\}^k$, $r_i^{(4)} \in \text{Kspace}_k$, $r_i^{(5)} \in \{0,1\}^k$, $r_i^{(6)} \in \text{Kspace}_k$, $r_i^{(7)} \in \{0,1\}^k$, $r_i^{(8)} \in \text{Kspace}_k$, $k_1^{(1)} \in \{0,1\}^k$, and $k_1^{(2)} \in \text{Kspace}_k$ as short-term secret strings.

The short-term secret string generator 202 stores the short-term secret strings $r_1^{(1)}$, $r_1^{(2)}$, $r_1^{(3)}$, $r_1^{(4)}$, $r_1^{(5)}$, $r_1^{(6)}$, $r_1^{(7)}$, $r_1^{(8)}$, $k_1^{(1)}$, and $k_2^{(2)}$ in the short-term secret string storage unit 210.

S201-32) The twisted pseudo-random function unit 203 generates $m_1 = \text{tPRF}_A(r_1^{(1)}, r_1^{(2)}, st_1, st'_1)$, $n_1 = \text{tPRF}_A(r_1^{(3)}, r_1^{(4)}, st_1, st'_1)$, $m_{N+1} = \text{tPRF}_B(r_1^{(5)}, r_1^{(6)}, st_1, st'_1)$, $n_{N+1} = \text{tPRF}_B(r_1^{(7)}, r_1^{(8)}, st_1, st'_1)$, and $k_1 = \text{tPRF}(k_1^{(1)}, k_1^{(2)}, st_1, st'_1)$. The long-term secret strings $st_i$ and $st'_1$ stored in the long-term secret string storage unit 209 are used.

S201-33) The isogeny calculating unit 204 calculates an isogeny $\varphi_1: E \to E_1$ having a subgroup $K_1$ of E generated by $[m_1]P_A+[n_1]Q_A$ as a kernel and an elliptic curve $E_1$ associated with the isogeny $\varphi_1$.

The isogeny calculating unit 204 also calculates an isogeny $\varphi_{N+1}: E \to E_{N+1}$ having a subgroup $K_{N+1}$ of E generated by the $[m_{N+1}]P_B+[n_{N+1}]Q_B$ as a kernel and an elliptic curve $E_{N+1}$ associated with the isogeny $\varphi_{N+1}$.

S201-34) The isogeny calculating unit 204 calculates $\varphi_1(P_B)$, $\varphi_1(Q_B)$, $\varphi_{N+1}(P_A)$, and $\varphi_{N+1}(Q_A)$ S201-35) The communication unit 208 transmits $\varphi_1(P_B)$, $\varphi_1(Q_B)$, $E_1$, $\varphi_{N+1}(P_A)$, $\varphi_{N+1}(Q_B)$, and $E_{N+1}$ to the key distribution server 10. Thus, the public values $\varphi_1(P_B)$, $\varphi_1(Q_B)$, $E_1$, $\varphi_{N+1}(P_A)$, $\varphi_{N+1}(Q_B)$, and $E_{N+1}$ of the user terminal $20_1$, which is the representative user terminal, are transmitted to the key distribution server 10.

Here, $m_1$, $n_1$, $m_{N+1}$, and $n_{N+1}$ in S201-32 described above can be generated from the twisted pseudo-random function when necessary using the long-term secret string stored in the long-term secret string storage unit 209 and the short-term secret string stored in the short-term secret string storage unit 210. Thus, it is preferable not to store $m_1$, $n_1$, $m_{N+1}$, and $n_{N+1}$ for safety reasons.

However, if safety is not overly of consideration, in S201-32 described above, $m_1$ and $n_1$ may be randomly generated from Ex. 28, $m_{N+1}$ and $n_{N+1}$ may be randomly generated from Ex. 29, and $m_1$, $n_1$, $m_{N+1}$, and $n_{N+1}$ may be stored.

$$Z/l_A^{e_A}Z \quad \text{[Ex. 28]}$$

$$Z/l_B^{e_B}Z \quad \text{[Ex. 29]}$$

Step S202: Key Distribution Step (Round1)

S202-3) The communication unit 105 receives the public values $\varphi_1(P_B)$, $\varphi_1(Q_B)$, $E_1$, $\varphi_{N+1}(P_A)$, $\varphi_{N+1}(Q_B)$, and $E_{N+1}$ from the user terminal $20_1$, which is i=1. The communication unit 105 also receives the public values $\varphi_i(P_B)$, $\varphi_i(Q_B)$, and $E_i$ from the user terminal $20_i$ (i=3, 5, ..., N) where i is an odd number other than 1, and receives the public values $\varphi_i(P_A)$, $\varphi_i(Q_A)$, and $E_i$ from the user terminal $20_i$ (i=2, 4, ..., N−1) where i is an even number.

S202-4) The communication unit 105 transmits sid, $\varphi_{i-1}(P_A)$, $\varphi_{i-1}(Q_A)$, $E_{i-1}$, $\varphi_{i+1}(P_A)$, $\varphi_{i+1}(Q_A)$, and $E_{i+1}$ to the user terminal $20_i$ (i=1, 3, ..., N) where i is an odd number.

The communication unit 105 transmits sid, $\varphi_{i-1}(P_B)$, $\varphi_{i-1}(Q_B)$, $E_{i-1}$, $\varphi_{i+1}(P_B)$, $\varphi_{i+1}(Q_B)$, and $E_{i+1}$ to the user terminal $20_i$ (i=2, 4, ..., N−1) where i is an even number.

Step S203: Second Key Generation Step (Round2)

The user terminal $20_i$ (i=3, 5, ..., N), where i is an odd number other than 1, executes S203-11 to S203-16 described above. The user terminal $20_i$ (i=2, 4, ..., N−1), where i is an even number, executes S203-21 to S203-26 described above.

Subsequent S203-41 to S203-47 are executed by the user terminal $20_1$, where i is 1, (i.e., the representative user terminal).

S203-41) The communication unit 208 receives sid, $\varphi_N(P_A)$, $\varphi_N(Q_A)$, $E_N$, $\varphi_2(P_A)$, $\varphi_2(Q_A)$, and $E_2$ from the key distribution server 10.

S203-42) The isogeny calculating unit 204 calculates an isogeny $\varphi_{N,N+1}: E_N \to E_{N,N+1}$ having a subgroup $K_{N,N+1}$ of $E_N$ generated by $[m_{N+1}]\varphi_N(P_B)+[n_{N+1}]\varphi_N(Q_B)$ as a kernel, and an elliptic curve $E_{N,N+1}$ associated with the isogeny $\varphi_{N,N+1}$.

Similarly, the isogeny calculating unit 204 calculates the isogeny $\varphi_{2,1}: E_2 \to E_{2,1}$ having the subgroup $K_{2,1}$ of $E_2$ generated by $[m_1]\varphi_2(P_A)+[n_1]\varphi_2(Q_A)$ and the elliptic curve $E_{2,1}$ associated with the isogeny $\varphi_{2,1}$.

S203-43) The isogeny calculating unit 204 calculates a j-invariant $j(E_{N, N+1})$ of the elliptic curve $E_{N, N+1}$ and a j-invariant $j(E_{2, 1})$ of the elliptic curve $E_{2, 1}$.

S203-44) Next, the first pseudo-random function unit 205 calculates $K_1^{(1)}=F(sid, j(E_{N,N+1}))$ and $K_1^{(r)}=F(sid, j(E_{2,1}))$.

S203-45) Next, the first pseudo-random function unit 205 calculates a bitwise exclusive or value $T_1$ of $K_1^{(1)}$ and $K_1^{(r)}$.

S203-46) Next, the first pseudo-random function unit 205 calculates an exclusive logical or value T' of $K_1^{(1)}$ and $k_1$.

S203-47) The communication unit 208 transmits T' and $T_1$ to the key distribution server 10.

Subsequent steps S204 to S205 are similar to the steps when N is an even number, and the description will be omitted.

Second Embodiment

In the following, a second embodiment will be described. In the second embodiment, similar processes are performed when N is an even number and when N is an odd number. That is, unlike the first embodiment, in the second embodiment, there is no case classification when N is an even number or an odd number.

Step S201: First Key Generation Step (Round1)

Subsequent S201-41 to S201-45 are executed by the user terminal $20_i$ (i=1, 2, ..., N).

S201-41) The short-term secret string generator 202 uniformly randomly generates $r_i^{(1)} \in \{0, 1\}^k$, $r_i^{(2)} \in Kspace_k$, $r_i^{(3)} \in \{0, 1\}^k$, $r_i^{(4)} \in Kspace_k$, $r_i^{(5)} \in \{0, 1\}^k$, $r_i^{(6)} \in Kspace_k$, $r_i^{(7)} \in \{0, 1\}^k$, $r_i^{(8)} \in Kspace_k$, $k_i^{(1)} \in \{0, 1\}^k$, and $k_i^{(2)} \in Kspace_k$ as short-term secret strings.

The short-term secret string generator 202 stores the short-term secret strings $r_i^{(1)}$, $r_i^{(2)}$, $r_i^{(3)}$, $r_i^{(4)}$, $r_i^{(5)}$, $r_i^{(6)}$, $r_i^{(7)}$, $r_i^{(8)}$, $k_i^{(1)}$, and $k_i^{(2)}$ in the short-term secret string storage unit 210.

S201-42) The twisted pseudo-random function unit 203 generates $m_i^{(1)}=tPRF_A(r_i^{(1)}, r_i^{(2)}, st_i, st'_i)$, $n_i^{(1)}=tPRF_A(r_i^{(3)}, r_i^{(4)}, st_i, st'_i)$, $m_i^{(2)}=tPRF_B(r_i^{(5)}, r_i^{(6)}, st_i, st'_i)$, $n_i^{(2)}=tPRF_B(r_i^{(7)}, r_i^{(8)}, st_i, st'_i)$, and $k_i=tPRF(k_i^{(1)}, k_i^{(2)}, st_i, st'_i)$. The long-term secret strings $st_i$ and $st'_i$ stored in the long-term secret string storage unit 209 are used.

S201-43) The isogeny calculating unit 204 calculates an isogeny $\varphi_i^{(1)}: E \to E_i^{(1)}$ having a subgroup $K_i^{(1)}$ of E generated by $[m_i^{(1)}]P_A+[n_i^{(1)}]Q_A$ as a kernel and an elliptic curve $E_i^{(1)}$ associated with the isogeny $\varphi_i^{(1)}$.

The isogeny calculating unit 204 calculates an isogeny $\varphi_i^{(2)}: E \to E_i^{(2)}$ having a subgroup $K_i^{(2)}$ of E generated by $[m_i^{(2)}]P_B+[n_i^{(2)}]Q_B$ as a kernel and an elliptic curve $E_i^{(2)}$ associated with the isogeny $\varphi_i^{(2)}$.

S201-44) The isogeny calculating unit 204 calculates $\varphi_i^{(1)}(P_B)$, $\varphi_i^{(1)}(Q_B)$, $\varphi_i^{(2)}(P_A)$, and $\varphi_i^{(2)}(Q_A)$.

S201-45) The communication unit 208 transmits $\varphi_i^{(1)}(P_B)$, $\varphi_i^{(1)}(Q_B)$, $E_i^{(1)}$, $\varphi_i^{(2)}(P_A)$, $\varphi_i^{(2)}(Q_B)$, and $E_1^{(2)}$ to the key distribution server 10. Thus, the public values $\varphi_i^{(1)}(P_B)$, $\varphi_i^{(1)}(Q_E)$, $E_i^{(1)}$, $\varphi_i^{(2)}(P_A)$, $\varphi_i^{(2)}(Q_B)$, and $E_1^{(2)}$ of the user terminal $20_i$ are transmitted to the key distribution server 10.

Here, $m_i^{(1)}$, $n_i^{(1)}$, $m_i^{(2)}$, and $n_i^{(2)}$ in S201-42 described above can be generated from the twisted pseudo-random function when necessary using the long-term secret string stored in the long-term secret string storage unit 209 and the short-term secret string stored in the short-term secret string storage unit 210. Thus, it is preferable not to store $m_i^{(1)}$, $n_i^{(1)}$, $m_i^{(2)}$, and $n_i^{(2)}$ for safety reasons.

However, if safety is not overly of consideration, in S201-32 described above, $m_i^{(1)}$ and $n_i^{(1)}$ may be randomly generated from Ex. 30, $m_i^{(2)}$ and $n_i^{(2)}$ may be randomly generated from Ex. 31, and $m_i^{(1)}$, $n_i^{(1)}$, $m_i^{(2)}$, and $n_i^{(2)}$ may be stored.

$$Z/l_A^{e_A}Z \quad [\text{Ex. 30}]$$

$$Z/l_B^{e_B}Z \quad [\text{Ex. 31}]$$

Step S202: Key Distribution Step (Round1)

S202-5) The communication unit 105 receives public values $\varphi_i^{(1)}(P_B)$, $\varphi_i^{(1)}(Q_B)$, $E_i^{(1)}$, $\varphi_i^{(2)}(P_A)$, $\varphi_i^{(2)}(Q_B)$, and $E_1^{(2)}$ from the user terminal $20_i$.

S202-6) The communication unit 105 transmits sid, $\varphi_{i-1}^{(1)}(P_B)$, $\varphi_{i-1}^{(1)}(Q_B)$, $E_{i-1}^{(1)}$, $\varphi_{i+1}^{(2)}(P_A)$, $\varphi_{i+1}^{(2)}(Q_B)$ and $E_{i+1}^{(2)}$ to the user terminal $20_i$.

Step S203: Second Key Generation Step (Round2)

Subsequent S201-51 to S201-56 are executed by the user terminal $20_i$ (i=1, 2, ..., N). However, processing contents from S201-54 to S203-56 in the user terminal $20_1$, which is the representative user terminal, are different from processing contents from S201-54 to S203-56 in the user terminal $20_i$ (i=2, 3, ..., N), which is other than the user terminal $20_1$.

S203-51) The communication unit 208 receives sid, $\varphi_{i-1}^{(1)}(P_B)$, $\varphi_{i-1}^{(1)}(Q_B)$, $E_{i-1}^{(1)}$, $\varphi_{i+1}^{(2)}(P_A)$, $\varphi_{i+1}^{(2)}(Q_B)$ and $E_{i+1}^{(2)}$ from the key distribution server 10.

S203-52) The isogeny calculating unit 204 calculates an isogeny $\varphi_{i-1,i}^{(1)}: E_{i-1}^{(1)} \to E_{i-1,i}^{(1)}$ having a subgroup $K_{i-1,i}^{(1)}$ of $E_{i-1}^{(1)}$ generated by $[m_i^{(2)}]\varphi_{i-1}^{(1)}((P_B)+[n_i^{(2)}]\varphi_{i-1}^{(1)}(Q_B)$ as a kernel and the elliptic curve $E_{i-1,i}^{(1)}$ associated with the isogeny $\varphi_{i-1,i}^{(1)}$.

Similarly, the isogeny calculating unit 204 calculates an isogeny $\varphi_{i+1,i}^{(2)}: E_{i+1}^{(2)} \to E_{i+1,i}^{(2)}$ having a subgroup $K_{i+1,i}^{(2)}$ of $E_{i+1}^{(2)}$ generated by $[m_i^{(1)}]\varphi_{i+1}^{(2)}(P_A)+[n_i^{(1)}]\varphi_{i+1}^{(2)}(Q_A)$ as a kernel and the elliptic curve $E_{i+1,i}^{(2)}$ associated with the isogeny $\varphi_{i+1,i}^{(2)}$.

S203-53) The isogeny calculating unit 204 calculates a j-invariant $j(E_{i-1,i}^{(1)})$ of the elliptic curve $E_{i-1,i}^{(1)}$ and a j-invariant $j(E_{i+1,i}^{(2)})$ of the elliptic curve $E_{i+1,i}^{(2)}$.

S203-54) The first pseudo-random function unit 205 of the user terminal $20_i$ (i=2, 3, ..., N) calculates $K_i^{(1)}=F(sid, j(E_{i-1,i}^{(1)}))$ and $K_i^{(r)}=F(sid, j(E_{i+1,i}^{(2)}))$.

The first pseudo-random function unit 205 of the user terminal $20_1$ calculates $K_1^{(1)}=F(sid, j(E_{N,1}^{(1)}))$ and $K_1^{(r)}=F(sid, j(E_{2,1}^{(2)}))$.

S203-55) Next, the first pseudo-random function unit 205 of the user terminal $20_i$ (i=2, 3, ..., N) calculates a bitwise exclusive or value $T_i$ of $K_i^{(1)}$ and $K_i^{(r)}$.

In addition to the exclusive or value $T_i$ of $K_i^{(1)}$ and $K_i^{(r)}$, the first pseudo-random function unit 205 of the user terminal $20_1$ calculates an exclusive or value T' of $K_1^{(1)}$ and $k_1$. Here, $k_1$ is generated in the first key generation step (S201).

S203-56) The communication unit 208 of the user terminal $20_i$ (i=2, 3, ..., N) transmits $k_i$ and $T_i$ to the key distribution server 10. Here, $k_i$ is generated in the first key generation step (S201).

The communication unit 208 of the user terminal $20_1$ transmits T' and $T_1$ to the key distribution server 10.

Since subsequent steps S204 to S205 are similar to the steps in the first embodiment, the description will be omitted.

<Hardware Configuration>

Figure 6:
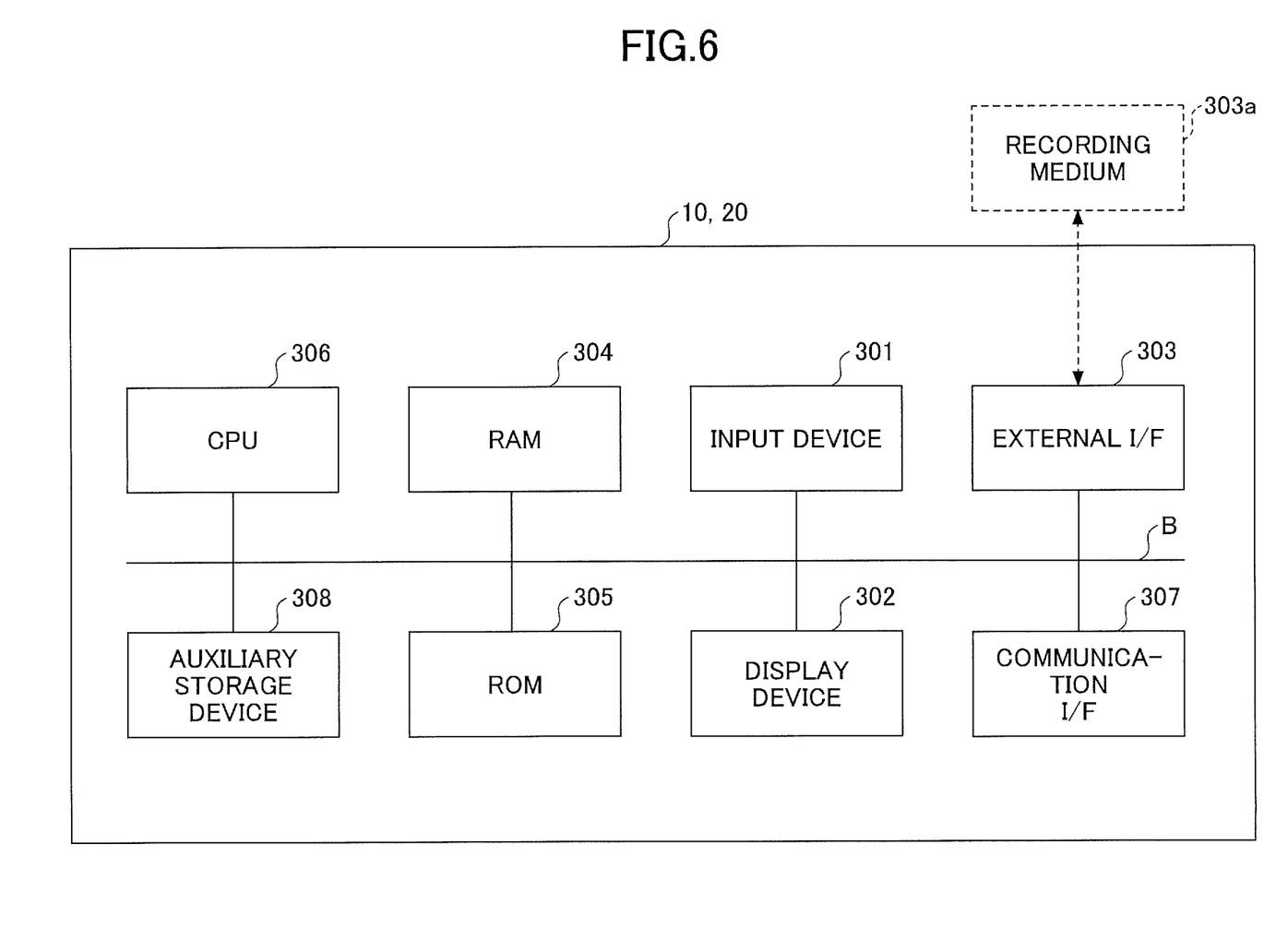
FIG. 6 is a drawing illustrating an example of a hardware configuration of the key distribution server and the user terminal according to the embodiment of the present invention.

As illustrated in FIG. 6, the key distribution server 10 and the user terminal 20 according to the embodiment of the present invention include an input device 301, a display device 302, an external I/F 303, a random access memory (RAM) 304, a read only memory (ROM) 305, a central processing unit (CPU) 306, a communication I/F 307, and an auxiliary storage device 308. Each of these hardware components is connected through a bus B in a communicable manner.

The input device 301 is, for example, a keyboard, a mouse, or a touch panel. The display device 302 is a display, for example. The key distribution server 10 does not need to include at least one of the input device 301 and the display device 302.

The external I/F 303 is an interface with an external device. The external device is a recording medium 303a, for example. Examples of the recording medium 303a include a compact disc (CD), a digital versatile disk (DVD), a secure digital (SD) memory card, and a universal serial bus (USB) memory card. The recording medium 303a may record, for example, one or more programs for implementing each functional unit of the key distribution server 10 or one or more programs for implementing each functional unit of the user terminal 20.

The RAM 304 is a volatile semiconductor memory that temporarily stores a program and data. The ROM 305 is a non-volatile semiconductor memory that can store a program and data even when the power is turned off.

The CPU 306 is an arithmetic unit that loads a program and data from the ROM 305, the auxiliary storage device 308, or the like into the RAM 304, and executes a process. Each functional unit of the key distribution server 10 and each functional unit of the user terminal 20 are achieved by the CPU 306 executing one or more programs.

The communication I/F 307 is an interface for connecting to the network 30. One or more programs that implement each functional unit of the key distribution server 10 and one or more programs that implement each functional unit of the user terminal 20, for example, may be obtained (or downloaded) from a predetermined server or the like through the communication I/F 307.

The auxiliary storage device 308 is a non-volatile storage device, such as a hard disk drive (HDD) or a solid state drive (SSD). In the auxiliary storage device 308, one or more programs that implement each functional unit of the key distribution server 10 and one or more programs that implement each functional unit of the user terminal 20 are recorded, for example.

The key distribution server 10 and the user terminal 20 according to the embodiment of the present invention have the hardware configuration illustrated in FIG. 6. Thus, various processes described above can be achieved. FIG. 6 illustrates a case in which the key distribution server 10 according to the embodiment of the present invention is achieved by one information processing device, but the embodiment is not limited this. The key distribution server 10 according to the embodiment of the present invention may be achieved by multiple information processing devices.

SUMMARY

As described above, in the key exchange system 1 according to the embodiment of the present invention, by changing the DH key exchange in the DMKD protocol to the isogeny cryptography, it is possible to achieve a quantum-resistant multi-party key exchange.

Further, in the first embodiment of the key exchange system 1 according to the embodiment of the present invention, when the number N of the user terminals 20 is an even number, the user terminal $20_1$, the user terminal $20_3$, ... the user terminal $20_{N-1}$ calculate the respective public values from the basis $\{P_A, Q_A\}$, for example, and the user terminal $20_2$, the user terminal $20_4$, ..., the user terminal $20_N$ calculate the respective public values from the basis $\{P_B, Q_B\}$. This causes adjacent user terminals 20 among the user terminals 20 (logically) arranged in ring form to calculate public values by using different bases and this enables the key exchange of the isogeny cryptography between adjacent user terminals 20 to be easily performed in a small number of rounds (i.e., two rounds).

With respect to the above, when the number N of the user terminals 20 is an odd number, the user terminal $20_1$, which is the representative user terminal, calculates the public values from both of the basis $\{P_A, Q_A\}$ and the basis $\{P_B, Q_B\}$; the user terminal $20_3$, the user terminal $20_5$, ..., and the user terminal $20_{N-1}$ calculate the respective public values from the basis $\{P_A, Q_A\}$; and, the user terminal $20_2$, the user terminal $20_4$, ..., the user terminal $20_N$ calculate the respective public values from the basis $\{P_B, Q_B\}$. As described, the representative user terminal calculates the public values from both of the basis $\{P_A, Q_A\}$ and the basis $\{P_B, Q_B\}$, so that behavior similar to the behavior when N is an even number can be achieved in the user terminals 20 as a whole, and the key exchange of the isogeny cryptography can be easily performed in a small number of rounds.

In the second embodiment of the key exchange system 1 according to the embodiment of the present invention, all the user terminals 20 calculate the public values from both of the basis $\{P_A, Q_A\}$ and the basis $\{P_B, Q_B\}$ regardless of whether the number N of the user terminals 20 is an even number or an odd number. Thus, behavior similar to the behavior when N is an even number in the first embodiment can be achieved in the user terminals 20 as a whole, and the key exchange of the isogeny cryptography can be easily performed in a small number of rounds. Further, in the second embodiment, since the same processing contents are used regardless of whether the number of users is an even number or an odd number, for example, a key exchange process in which a conditional branch or the like does not occur depending on whether the number of users is an even number or an odd number can be achieved.

As described, in the key exchange system 1 according to the embodiment of the present invention, it is possible to achieve a multi-party key exchange that is quantum-resistant and that requires a smaller number of rounds (i.e., 2 rounds) than the number of rounds of the method described in Non-Patent Document 1 (i.e., a multi-party key exchange that is quantum-resistant and that requires a low communication cost)

The present invention is not limited to the specifically disclosed embodiments described above, and various modifications and variations can be made without departing from the scope of the claims.

The present application is based on and claims priority to Japanese Patent Application No. 2018-076343, filed Apr. 11, 2018, the entire contents of which are incorporated herein by reference.

LIST OF REFERENCE SYMBOLS 1 key exchange system
10 key distribution server
20 user terminal
101 setup unit
102 long-term secret string generator
103 short-term secret string generator
104 public information calculating unit
105 communication unit
106 long-term secret string storage
107 short-term secret string storage
201 long-term secret string generator
202 short-term secret string generator
203 twisted pseudo-random function unit
204 isogeny calculating unit
205 first pseudo-random function unit
206 secret information calculating unit
207 second pseudo-random function unit
208 communication unit
209 long-term secret string storage
210 short-term secret string storage
211 session information storage unit

The invention claimed is:

1. A key distribution system comprising:
N terminal devices $U_i$(i=1, ..., N) where N is greater than or equal to 2;
a key distribution server used for exchanging a session key by using isogeny cryptography between the N terminal devices $U_i$, the key distribution system including one or more information processing devices configured to:

calculate a first public value using a basis of a first torsion subgroup of a predetermined elliptic curve at an odd-numbered terminal device $U_i$ (i=1, . . . , N−1) and calculate a second public value using a basis of a second torsion subgroup of the predetermined elliptic curve at an even-numbered terminal device $U_i$(i =2, . . . , N), among the terminal devices $U_i$, when N is an even number;

distribute the first public value calculated at the odd-numbered terminal device $U_i$ to a terminal device $U_{i−1}$(which is a terminal device $U_N$ when i=1) and a terminal device $U_{i+1}$ (which is a terminal device $U_1$ when i=N), and distribute the second public value calculated at the even-numbered terminal device $U_i$ to a terminal device $U_{i−1}$ and a terminal device $U_{i+1}$, from the key distribution server;

use second public values to generate the session key at the odd-numbered terminal device $U_i$, and use first public values to generate the session key at the even-numbered terminal device $U_i$;

wherein calculating the first public value uses the basis of the first torsion subgroup and calculating the second public value uses the basis of the second torsion subgroup at a predetermined terminal device $U_i$ among the terminal devices $U_i$, when N is an odd number;

wherein calculating the first public values further includes calculating $\phi_i(P_B)$ and $\phi_i(Q_B)$ as said first public values, where the basis of the first torsion subgroup is $\{P_A, Q_A\}$, the basis of the second torsion subgroup is $\{P_B, Q_B\}$, a first twisted pseudo-random function value related to the first torsion subgroup is $m_i$, a second twisted pseudo-random function value related to the first torsion subgroup is $n_i$, and an isogeny having a subgroup of the elliptic curve as a kernel is $\phi_i$, the subgroup of the elliptic curve being generated by $[m_i]P_A+[n_i]A_A$;

wherein calculating the second public values further includes calculating $\phi'_i(P_A)$ and $\phi'_i(Q_A)$ as said second public values, where a third twisted pseudo-random function value related to the second torsion subgroup is $m'_i$, a fourth twisted pseudo-random function value related to the second torsion subgroup is $n'_i$, and an isogeny having a subgroup of the elliptic curve as a kernel is $\phi'_i$, the subgroup of the elliptic curve being generated by $[m'_i]P_B+[n'_i]Q_B$; and establishing at least one session using the session key generated at the odd-numbered terminal device $U_i$, and at least one session using the session key generated at the even-numbered terminal device $U_i$.

2. A key distribution system comprising:

N terminal devices $U_i$(i=1, . . . , N) where N is greater than or equal to 2; and a key distribution server used for exchanging a session key by using isogeny cryptography between the N terminal devices $U_i$, the key distribution system including one or more information processing devices configured to:

calculate a first public value using a basis of a first torsion subgroup of a predetermined elliptic curve and a second public value using a basis of a second torsion subgroup of the predetermined elliptic curve at each of the terminal devices $U_i$;

distribute the first public value and the second public value respectively calculated at the respective terminal devices $U_i$ to a terminal device $U_{i−1}$ (which is a terminal device $U_N$ when i=1) and a terminal device $U_{i+1}$(which is a terminal device $U_1$ when i=N), from the key distribution server; and use the first public value and the second public value distributed by the distributing unit to generate the session key at each of the terminal devices $U_i$;

wherein the calculating calculates $\phi_i(P_B)$ and $\phi_i(Q_B)$ as said first public values, where the basis of the first torsion subgroup is $\{P_A, Q_A\}$, the basis of the second torsion subgroup is $\{P_B, Q_B\}$, a first twisted pseudo-random function value related to the first torsion subgroup is $m_i$, a second twisted pseudo-random function value related to the first torsion subgroup is $n_i$, and an isogeny having a subgroup of the elliptic curve as a kernel is $\phi_i$, the subgroup of the elliptic curve being generated by $[m_i]P_A+[n_i]Q_A$, and wherein the calculating calculates $\phi'_i(P_A)$ and $\phi'_i(Q_A)$ as said second public values, where a third twisted pseudo-random function value related to the second torsion subgroup is $m'_i$, a fourth twisted pseudo-random function value related to the second torsion subgroup is $n'_i$, and an isogeny having a subgroup of the elliptic curve as a kernel is $\phi'_i$, the subgroup of the elliptic curve being generated by $[m'_i]P_B+[n'_i]Q_B$.

3. The key distribution system as claimed in claim 1, wherein the using second public values to generate the session key calculates a first j-invariant of an elliptic curve associated with an isogeny having a subgroup, generated by $[m_i]\phi_{i−1}(P_B)+[n_i]\phi_{i−1}(Q_B)$, of an elliptic curve as a kernel and a second j-invariant of an elliptic curve associated with an isogeny having a subgroup, generated by $[m_i]\phi_{i+1}(P_B)+[n_i]\phi_{i−1}(Q_B)$, of an elliptic curve as a kernel, and uses the calculated first j-invariant and second j-invariant to generate the session key, when said first public values $\phi_{i−1}(P_B)$, $\phi_{i−1}(Q_B)$, $\phi_{i+1}(P_B)$, and $\phi_{i+1}(Q_B)$ distributed by the distributing unit are distributed, and wherein the using second public values to generate the session key calculates a third j-invariant of an elliptic curve associated with an isogeny having a subgroup, generated by $[m'_i]\phi'_{i−1}(P_A)+[n'_i]\phi'_{i−1}(Q_A)$, of an elliptic curve as a kernel and a fourth j-invariant of an elliptic curve associated with an isogeny having a subgroup, generated by $[m'_i]\phi'_{i+1}(P_A)+[n'_i]\phi'_{i+1}(Q_A)$, of an elliptic curve as a kernel, and uses the calculated third j-invariant and fourth j-invariant to generate the session key, when said second public values $\phi_{i−1}(P_A)$, $\phi_{i−1}(Q_A)$, $\phi_{i+1}(P_A)$, and $\phi_{i+1}(Q_A)$ distributed by the distributing unit are distributed.

4. A key distribution method performed by a key distribution system including N terminal devices $U_i$(i=1, . . ., N) where N is greater than or equal to 2 and a key distribution server used for exchanging a session key by using isogeny cryptography between the N terminal devices $U_i$, the key distribution method comprising:

an isogeny calculating step configured to calculate a first public value using a basis of a first torsion subgroup of a predetermined elliptic curve at an odd-numbered terminal device $U_i$(i=1, . . . , N−1), and calculate a second public value using a basis of a second torsion subgroup of the predetermined elliptic curve at an even-numbered terminal device $U_i$ (i=2, . . . , N), among the terminal devices $U_i$, when N is an even number;

a distributing step configured to distribute the first public value calculated at the odd-numbered terminal device $U_i$ to a terminal device $U_{i−1}$(which is a terminal device $U_N$ when i=1) and a terminal device $U_{i+1}$ (which is a terminal device $U_1$ when i=N), and distribute the second public value calculated at the even-numbered terminal device $U_i$ to a terminal device $U_{i-1}$ and a terminal device $U_{i+1}$, from the key distribution server; and a key generating step configured to use the second public value distributed by the distributing step to generate the session key at the odd-numbered terminal device $U_i$, and use the first public value distributed by the distributing step to generate the session key at the even-numbered terminal device $U_i$, wherein the isogeny calculating step calculates the first public value using the basis of the first torsion subgroup and the second public value using the basis of the second torsion subgroup at a predetermined terminal device $U_i$ among the terminal devices $U_i$, when N is an odd number, and wherein the isogeny calculating step calculates $\phi_i(P_B)$ and $\phi_i(Q_B)$ as said first public values, where the basis of the first torsion subgroup is $\{P_A, Q_A\}$, the basis of the second torsion subgroup is $\{P_B, Q_B\}$, a first twisted pseudo-random function value related to the first torsion subgroup is $m_i$, a second twisted pseudo-random function value related to the first torsion subgroup is $n_i$, and an isogeny having a subgroup of the elliptic curve as a kernel is $\phi_i$, the subgroup of the elliptic curve being generated by $[m_i]P_A+[n_i]Q_A$, and wherein the isogeny calculating step calculates $\phi'_i(P_A)$ and $\phi'_i(Q_A)$ as said second public values, where a third twisted pseudo-random function value related to the second torsion subgroup is $m'_i$, a fourth twisted pseudo-random function value related to the second torsion subgroup is $n'_i$, and an isogeny having a subgroup of the elliptic curve as a kernel is $\phi'_i$, the subgroup of the elliptic curve being generated by $[m'_i]P_B+[n'_i]Q_B$.

5. A key distribution method performed by a key distribution system including N terminal devices $U_i$(i=1, ..., N) where N is greater than or equal to 2 and a key distribution server used for exchanging a session key by using isogeny cryptography between the N terminal devices $U_i$, the key distribution method comprising:

an isogeny calculating step configured to calculate a first public value using a basis of a first torsion subgroup of a predetermined elliptic curve and a second public value using a basis of a second torsion subgroup of the predetermined elliptic curve at each of the terminal devices $U_i$;

a distributing step configured to distribute the first public value and the second public value respectively calculated at the respective terminal devices $U_i$ to a terminal device $U_{i-1}$ (which is a terminal device $U_N$ when i=1) and a terminal device $U_{i+1}$ (which is a terminal device $U_1$ when i=N), from the key distribution server; and a key generating step configured to use the first public value and the second public value distributed by the distributing step to generate the session key at each of the terminal devices $U_i$, and wherein the isogeny calculating step calculates $\phi_i(P_B)$ and $\phi(Q_B)$ as said first public values, where the basis of the first torsion subgroup is $\{P_A, Q_A\}$, the basis of the second torsion subgroup is $\{P_B, Q_B\}$, a first twisted pseudo-random function value related to the first torsion subgroup is $m_i$, a second twisted pseudo-random function value related to the first torsion subgroup is $n_i$, and an isogeny having a subgroup of the elliptic curve as a kernel is $\phi_i$, the subgroup of the elliptic curve being generated by $[m_i]P_A+[n_i]Q_A$, and wherein the isogeny calculating step calculates $\phi'_i(P_A)$ and $\phi'_i(Q_A)$ as said second public values, where a third twisted pseudo-random function value related to the second torsion subgroup is $m'_i$, a fourth twisted pseudo-random function value related to the second torsion subgroup is $n'_i$, and an isogeny having a subgroup of the elliptic curve as a kernel is $\phi'_i$, the subgroup of the elliptic curve being generated by $[m'_i]P_B+[n'_i]Q_B$.

* * * * *